US012608023B2

(12) United States Patent
Ueda

(10) Patent No.: US 12,608,023 B2
(45) Date of Patent: Apr. 21, 2026

(54) ARTICLE TRANSPORT FACILITY

(71) Applicant: Daifuku Co., Ltd., Osaka (JP)

(72) Inventor: Yuichi Ueda, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 34 days.

(21) Appl. No.: 18/905,618

(22) Filed: Oct. 3, 2024

(65) Prior Publication Data

US 2025/0117027 A1 Apr. 10, 2025

(30) Foreign Application Priority Data

Oct. 4, 2023 (JP) ................................. 2023-173202

(51) Int. Cl.
*G05D 1/00* (2024.01)
*G05D 1/695* (2024.01)
*G05D 105/28* (2024.01)

(52) U.S. Cl.
CPC ......... *G05D 1/696* (2024.01); *G05D 2105/28* (2024.01)

(58) Field of Classification Search
CPC ............... G05D 1/696; G05D 2105/28; G05D 2109/18; G05D 1/241; G05D 1/622; G05D 1/6987; G05D 2107/70
See application file for complete search history.

(56) References Cited

U.S. PATENT DOCUMENTS

| | | | | |
|---|---|---|---|---|
| 2016/0167888 A1* | 6/2016 | Messina | ............... | G05D 1/0287 |
| | | | | 198/315 |
| 2018/0022405 A1* | 1/2018 | Gecchelin | ............ | B62D 47/025 |
| | | | | 701/23 |
| 2018/0345971 A1* | 12/2018 | Birnschein | ........... | B62D 21/152 |
| 2023/0219770 A1* | 7/2023 | Bretz | ..................... | B65G 47/44 |
| | | | | 198/537 |
| 2024/0149443 A1* | 5/2024 | Fox | .................. | G05B 19/41895 |

FOREIGN PATENT DOCUMENTS

JP 202250240 A 3/2022

* cited by examiner

*Primary Examiner* — Khoi H Tran
*Assistant Examiner* — Tien Minh Le
(74) *Attorney, Agent, or Firm* — The Webb Law Firm

(57) ABSTRACT

An article transport facility includes a plurality of transport vehicles. In a combined state in which the plurality of transport vehicles are combined in such a manner as to be adjacent to each other, the plurality of transport vehicles constitute a transport route in which a plurality of transfer sections cooperate to transport articles. While the transport vehicle performs a combining operation with a combination target vehicle that is another transport vehicle that is a combination target, the control unit at least partially disables a surrounding area sensor so as not to detect the combination target vehicle.

6 Claims, 7 Drawing Sheets

ARTICLE TRANSPORT FACILITY

CROSS-REFERENCE TO RELATED APPLICATION

This application claims priority to Japanese Patent Application No. 2023-173202 filed Oct. 4, 2023, the disclosure of which is hereby incorporated by reference in its entirety.

BACKGROUND OF THE INVENTION

1. Field of the Invention

The present invention relates to an article transport facility that includes a plurality of transport vehicles that transport articles by traveling on a travel surface without a track.

2. Description of Related Art

In recent years, automation of article transport has progressed in article transport facilities such as logistics warehouses. In an article transport facility of this type, for example, a transport vehicle (10) as disclosed in JP 2022-050240A is utilized in some cases.

The transport vehicle (10) is configured to transport an article by traveling unmanned on a travel floor. The facility described in JP 2022-050240A uses a transport configuration in which a transport command is given to each of a plurality of transport vehicles (10) and each of the plurality of transport vehicles (10) transports a specific article from a transport source to a transport destination based on the transport command.

SUMMARY OF THE INVENTION

In a technical field of this type, in addition to a transport configuration using the above-described unmanned transport vehicle, a transport configuration is also sometimes used in which, for example, a plurality of articles are continuously transported by a conveyor disposed along a transport route. However, in the case of operating a facility with a plurality of transport configurations, it is necessary to use transport devices of different types depending on the transport configuration.

In view of the above-described circumstance, an article transport facility is desired which can realize a plurality of transport configurations while suppressing the number of types of transport devices.

A technology for solving the above problem is as follows.

An article transport facility including a plurality of transport vehicles configured to transport an article by traveling on a travel surface without a track, in which each of the transport vehicles includes:

a placement section on which the article is placeable;

a transfer section configured to transfer the article placed on the placement section to and from a transfer target location;

a surrounding area detection sensor; and a control unit configured to control the transport vehicle, the control unit is configured to stop or decelerate the transport vehicle in response to the surrounding area detection sensor detecting an obstacle in a surrounding area of the transport vehicle while the transport vehicle is traveling, in a combined state in which the plurality of transport vehicles are combined in such a manner as to be adjacent to each other, the plurality of transport vehicles constitute a transport route in which the plurality of transfer sections cooperate to transport the article, and while the transport vehicle performs a combining operation with a combination target vehicle that is another transport vehicle that is a combination target, the control unit at least partially disables the surrounding area detection sensor in such a manner as not to detect the combination target vehicle.

According to this configuration, each transport vehicle can transport an article to various locations alone, and a plurality of transport vehicles can be combined to transport an article along a continuous transport route. That is, it is possible to use the transport vehicles to realize a transport configuration in which a specific article is transported to a specific location and a transport configuration in which a plurality of articles are transported to the same location. Also, these transport configurations of a plurality of types can be flexibly changed depending on the operation of the facility. According to this configuration, if each transport vehicle travels alone, it is possible to avoid contact between the transport vehicles by using the surrounding area detection sensors. The surrounding area detection sensors are partially disabled while the transport vehicles perform a combining operation, and therefore the transport vehicles can appropriately perform the combining operation. As described above, this configuration makes it possible to realize a plurality of transport configurations while suppressing the number of types of transport devices.

Further features and advantages of the techniques disclosed herein will become more apparent from the following description of exemplary and non-limiting embodiments, which are described with reference to the drawings.

DESCRIPTION OF THE INVENTION

Hereinafter, an embodiment of an article transport facility will be described with reference to the drawings.

Figure 1:
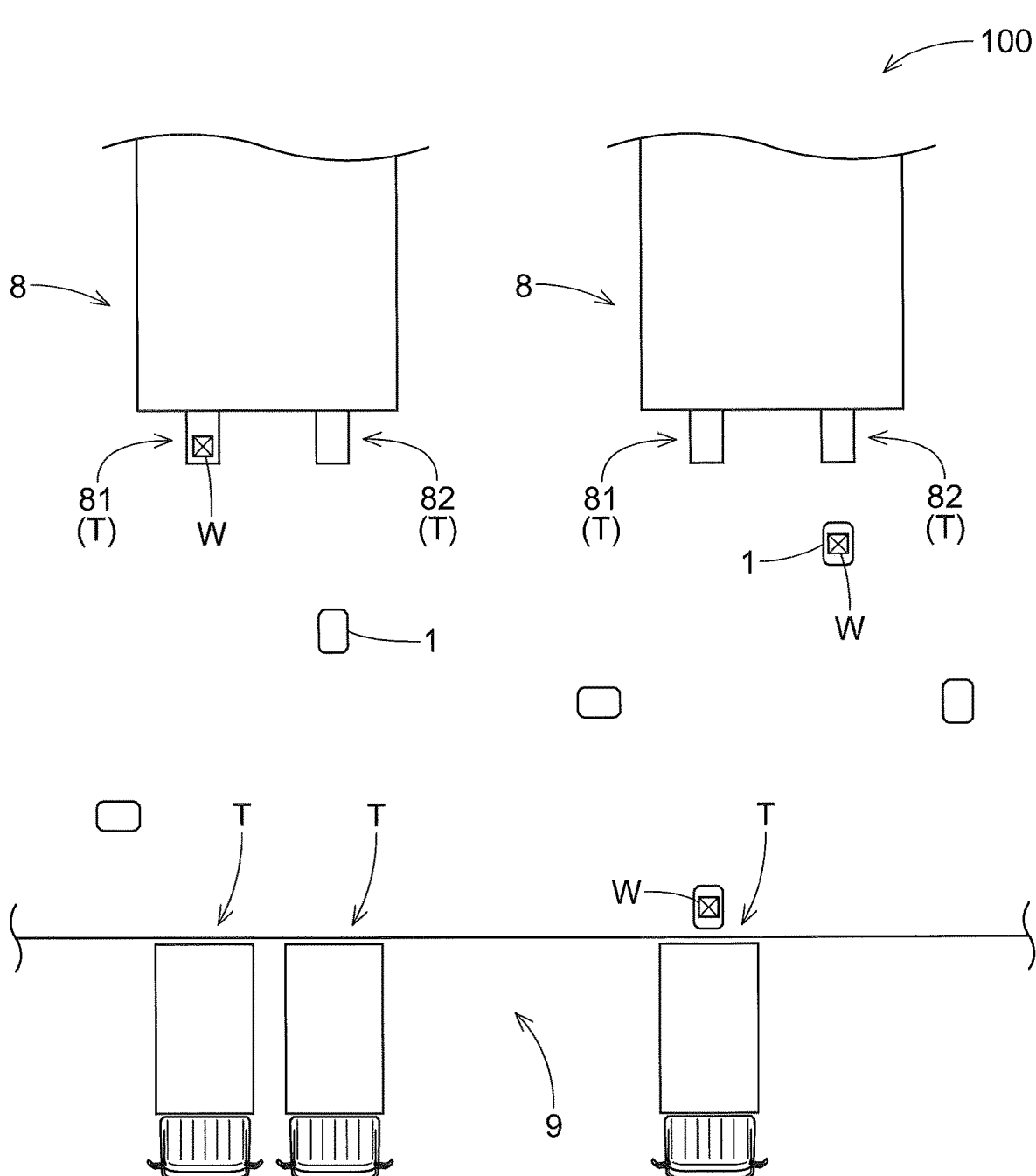
FIG. 1 is a plan view of an article transport facility.

As shown in FIG. 1, the article transport facility 100 includes a plurality of transport vehicles 1 that transport articles W by traveling on a travel surface without a track. The travel surface is, for example, the floor surface of the article transport facility. "Traveling without a track" means traveling without using a track such as a rail. Accordingly, the transport vehicles 1 can travel freely on the floor surface of the article transport facility 100 without being bound by a track such as a rail. For example, it is possible to use a configuration in which a plurality of detection objects, such as two-dimensional codes or RF (Radio Frequency) tags, are installed on the floor surface, and the transport vehicles 1 travel along routes connecting the plurality of detection objects. It is also possible to use a configuration in which a detection object of this type is not provided on the floor surface, and the transport vehicles 1 travel along a route calculated based on a result of recognizing the surrounding environment.

A plurality of transfer target locations T to which articles W are to be transferred are set in the article transport facility 100. The article transport facility 100 of this embodiment includes a receiving and shipping area 9 where receiving and shipping of the articles W is performed between the inside and outside of the facility, and automated warehouses 8 provided inside the facility.

The receiving and shipping area 9 is, for example, a truck berth. A plurality of transfer target locations T are set in the receiving and shipping area 9. The articles W to be received or the articles W to be shipped are transferred by a forklift or conveyor (not shown), or by a transport vehicle 1 at a transfer target location T in the receiving and shipping area 9.

In this embodiment, a plurality of automated warehouses 8 are provided inside the facility. Each of the plurality of automated warehouses 8 includes storage shelves (not shown) for storing articles W, a loading section 81 for loading articles W into the storage shelves, an unloading section 82 for unloading articles W from the storage shelves, and an in-shelf transport device (not shown) for transporting articles W within the storage shelves. Examples of the in-shelf transport device include a stacker crane, a lifter, a conveyor, and a transport cart.

The loading section 81 and the unloading section 82 are constituted using conveyors in this embodiment. Examples of a conveyor of this type include a roller conveyor, a belt conveyor, and a chain conveyor. The loading section 81 and the unloading section 82 are each one transfer target location T where articles W are transferred to and from the transport vehicle 1.

Figure 2:
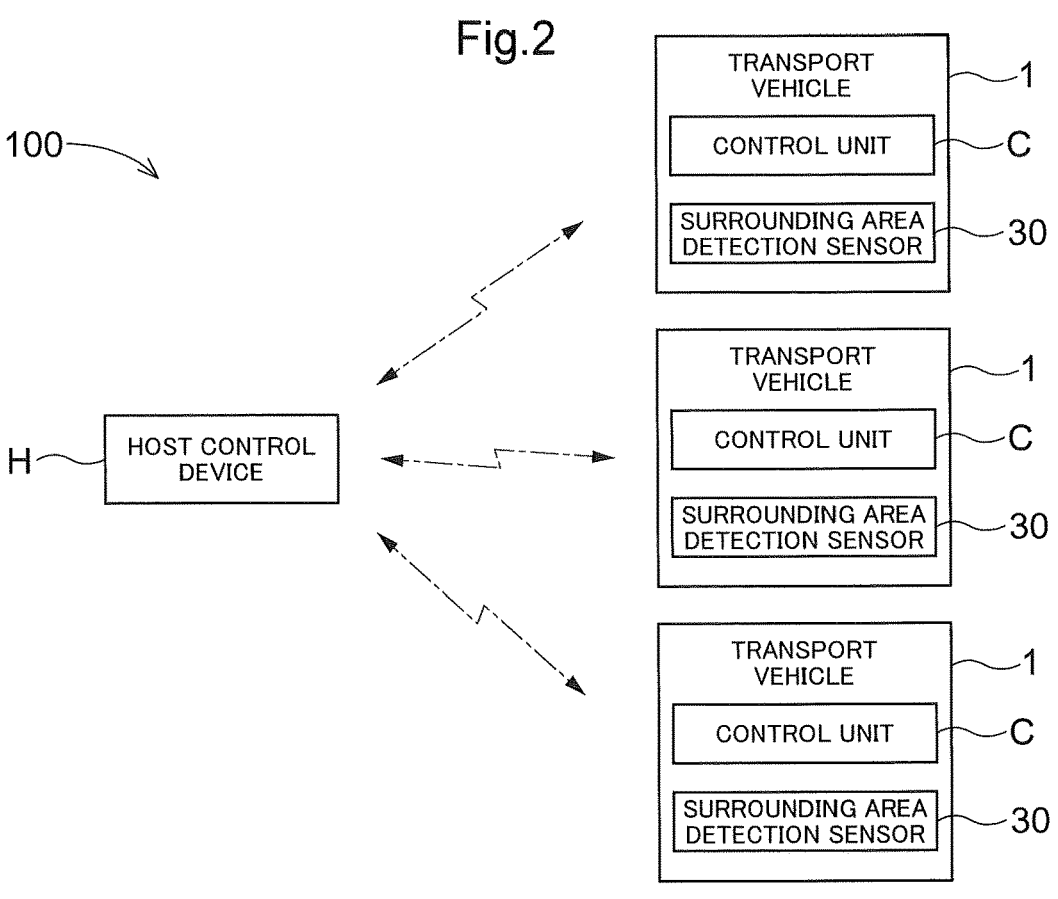
FIG. 2 is a control block diagram.

As shown in FIG. 2, the article transport facility 100 of this embodiment includes a host control device H that controls the plurality of transport vehicles 1. The host control device H can communicate with the plurality of transport vehicles 1. The host control device H is configured to transmit to each transport vehicle 1, for example, a transport command designating a specific article W, a transport source, and a transport destination. The transport vehicle 1 is configured to transport an article W based on a transport command upon receiving the transport command.

The transport vehicle 1 includes a control unit C that controls the transport vehicle 1. The control unit C is configured to control each functional unit included in the transport vehicle 1. The functional units of the transport vehicle 1 include a functional unit for traveling, a functional unit for transferring an article W, a functional unit for communication, and the like. The control unit C is configured to control the transport vehicle 1 in such a manner as to transport an article W from a designated transport source to a transport destination based on a transport command from the host control device H.

The host control device H and the control unit C each include, for example, a processor such as a microcomputer, peripheral circuits such as a memory, and the like. Each function is realized by cooperation between these pieces of hardware and a program to be executed on a processor of a computer or the like.

Figure 3:
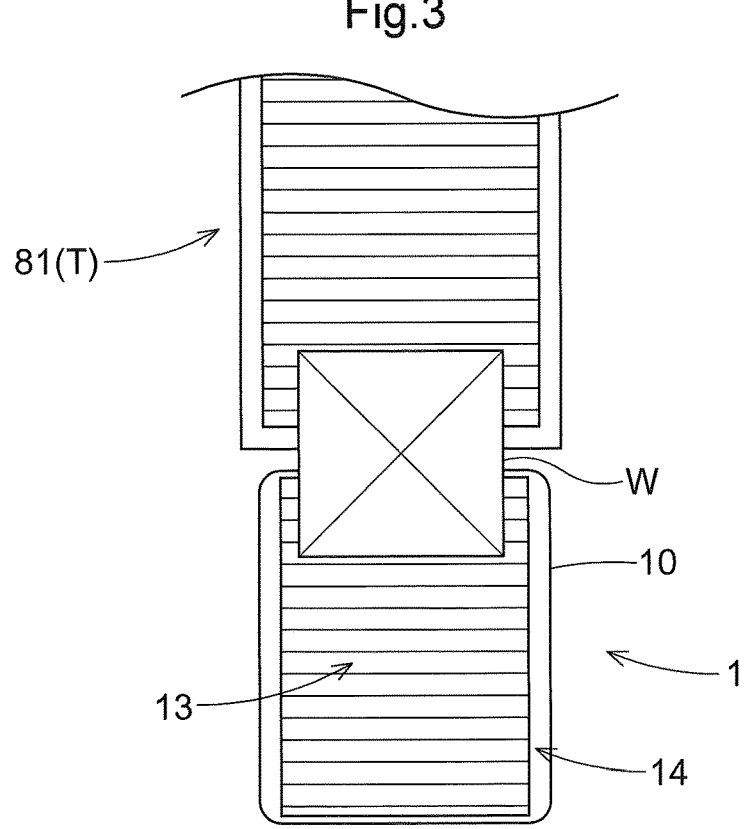
FIG. 3 is a diagram showing how an article is transferred between a transport vehicle and a transfer target location.
Figure 4:
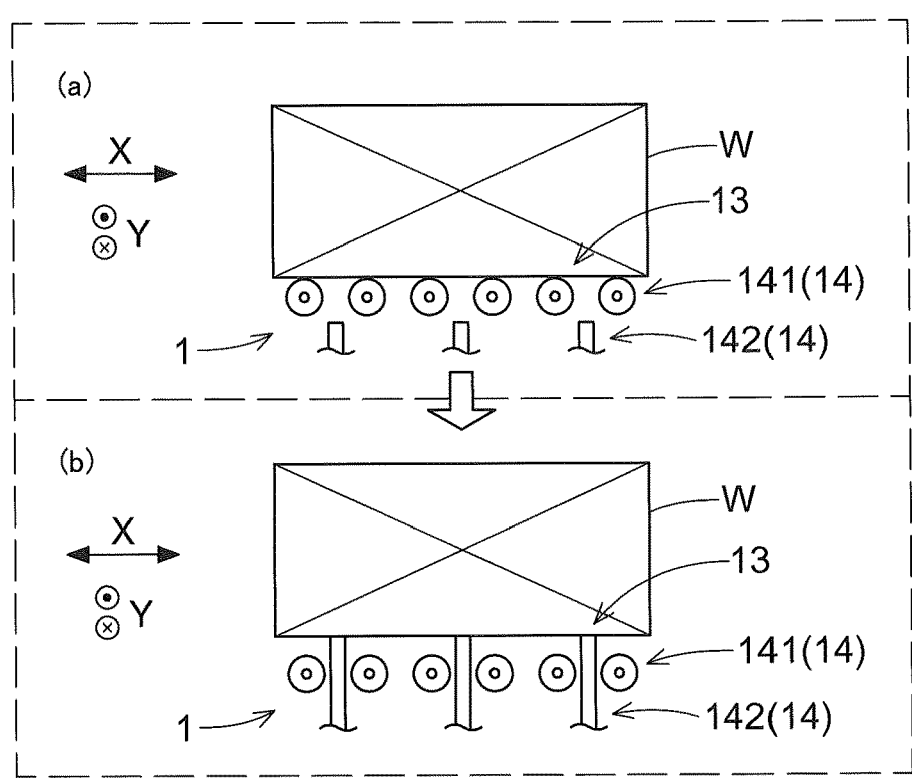
FIG. 4 is a diagram showing a transfer structure of the transport vehicle.

As shown in FIGS. 3 and 4, the transport vehicle 1 includes a placement section 13 on which an article W is placed, and a transfer section 14 that transfers an article W placed on the placement section 13 between the transport vehicle 1 and the transfer target location T. FIG. 3 shows how the transport vehicle 1 transfers an article W between the transport vehicle 1 and the loading section 81 serving as the transfer target location T. As shown in FIG. 3, the transport vehicle 1 is configured to deliver an article W placed on the placement section 13 to the loading section 81 (transfer target location T) by using the transfer section 14. Note that when the transport vehicle 1 transfers an article W between the transport vehicle 1 and the unloading section 82 serving as the transfer target location T, the above is reversed. That is, the transport vehicle 1 is configured to receive an article W placed in the unloading section 82 (the transfer target location T) by using the transfer section 14.

As shown in FIG. 4, the transfer section 14 of this embodiment includes a first transfer mechanism 141 that moves an article W on the placement section 13, and a second transfer mechanism 142 that moves an article W in a direction different from that of the first transfer mechanism 141. All or some of the plurality of transport vehicles 1 included in the article transport facility 100 are equipped with a transfer section 14 including a first transfer mechanism 141 and second transfer mechanism 142 of this type.

The first transfer mechanism 141 of this embodiment is configured to move an article W along a body front-rear direction X. In the illustrated example, the first transfer mechanism 141 is constituted using a roller conveyor. The rollers constituting the roller conveyor are arranged side by side in the body front-rear direction X, while extending in a body width direction Y.

The second transfer mechanism 142 of this embodiment is configured to move the article W along the body width direction Y. That is, the first transfer mechanism 141 and the second transfer mechanism 142 of this example are configured to move an article W along directions perpendicular to each other in a view in the up-down direction.

In this embodiment, the second transfer mechanism 142 is constituted using a conveyor having a plurality of chains or belts. The plurality of chains or belts (three belts in the illustrated example) are arranged between the rollers constituting the first transfer mechanism 141.

The second transfer mechanism 142 is configured to move up and down between a storage position located below the first transfer mechanism 141 and a protruding position located above the first transfer mechanism 141. The second transfer mechanism 142 is stored inside the transport vehicle 1 when in the storage position. In this state, the article W is supported by the first transfer mechanism 141, and the article W can be transferred by the first transfer mechanism 141 (see FIG. 4A). Also, the second transfer mechanism 142 protrudes above the first transfer mechanism 141 when in the protruding position. In this state, the article W is supported by the second transfer mechanism 142, and the article W can be transferred by the second transfer mechanism 142 (see FIG. 4B).

Figure 5:
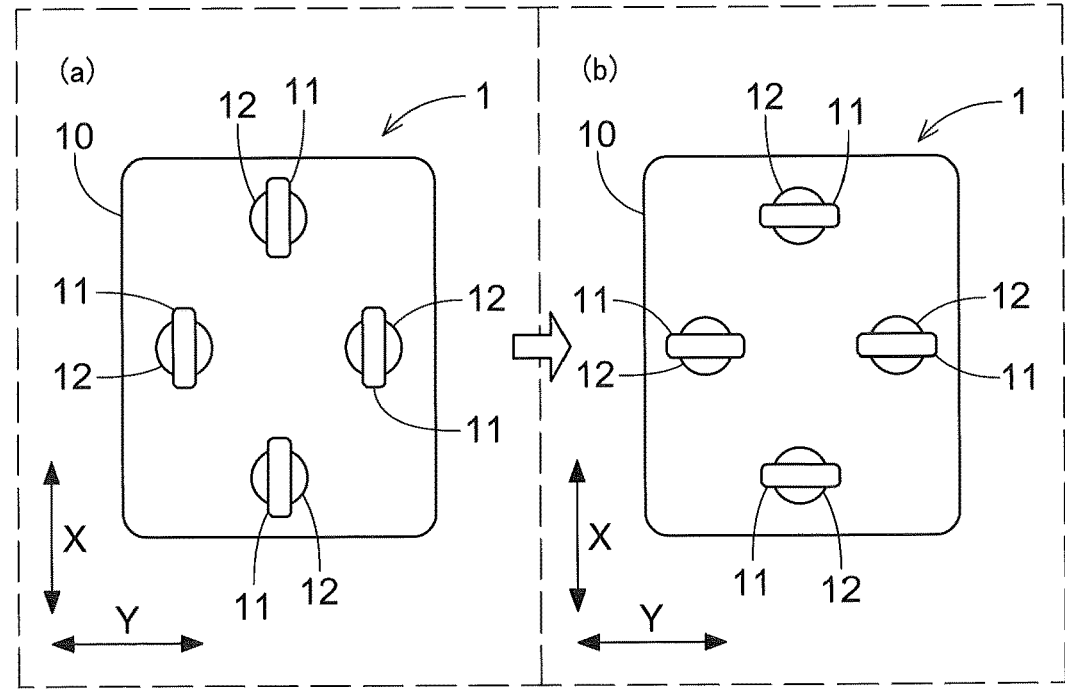
FIG. 5 is a diagram showing a travel structure of the transport vehicle

As shown in FIG. 5, the transport vehicle 1 includes a body 10 and a plurality of wheels 11 supported by the body 10. At least one of the plurality of wheels 11 is driven by a drive source such as a motor. This provides the transport vehicle 1 with a propulsive force.

In this embodiment, the transport vehicle 1 includes turning mechanisms 12 that turn each wheel 11 about a vertical axis. Each of the plurality of wheels 11 is supported on the body 10 via a turning mechanism 12. The turning mechanisms 12 orient the rotation axes of the wheels 11 in the body width direction Y, whereby the transport vehicle 1 assumes a first travel orientation in which it is possible to travel in the body front-rear direction X (see FIG. 5A). The turning mechanisms 12 orient the rotation axes of the wheels 11 in the body front-rear direction X, whereby the transport vehicle 1 assumes a second travel orientation in which it is possible to travel in the body width direction Y (see FIG. 5B). Note that the transport vehicle 1 can basically travel lengthwise and widthwise on the travel surface by, for example, changing its direction while in the first travel orientation.

Figure 6:
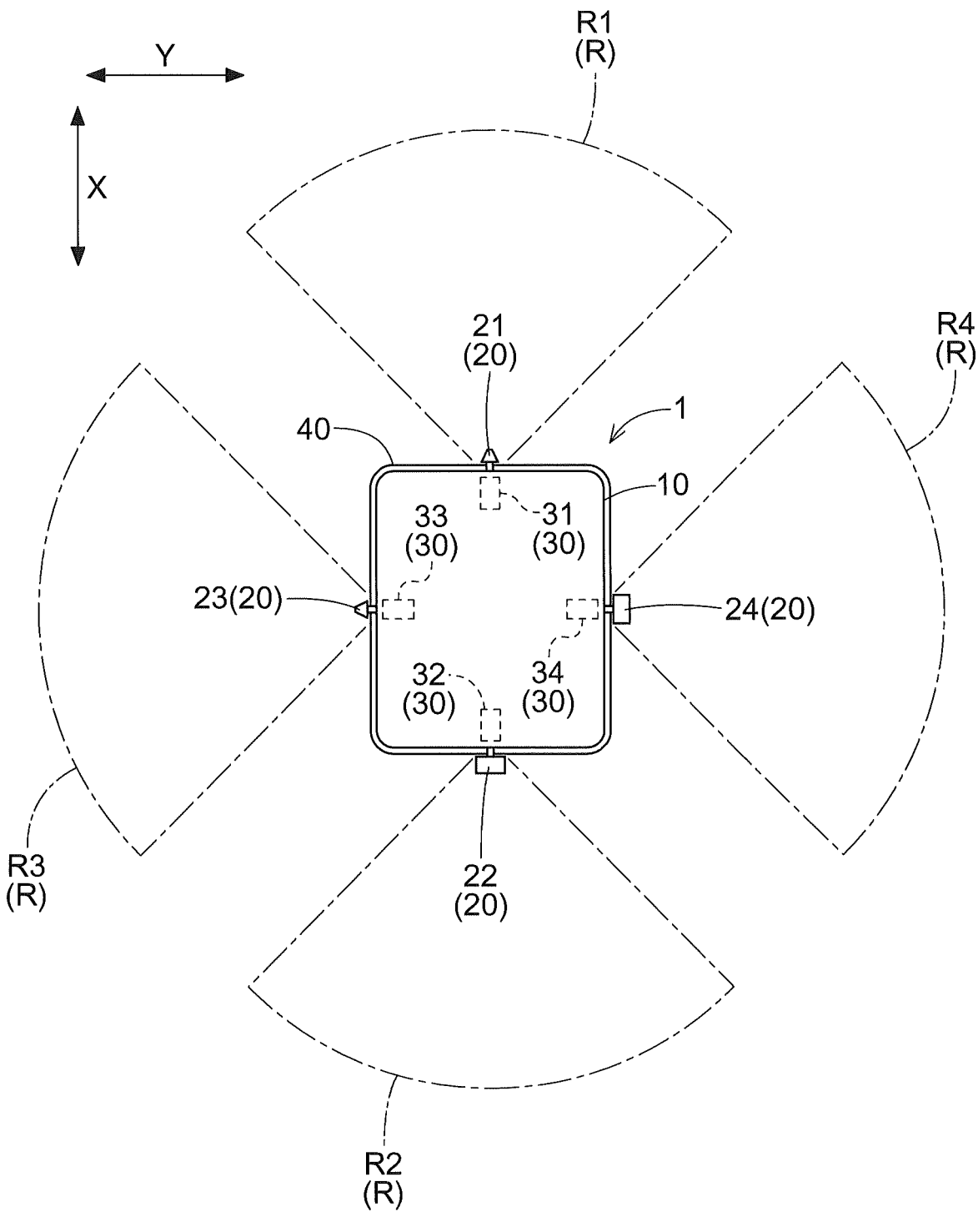
FIG. 6 is a schematic plan view of the transport vehicle

As shown in FIG. 6, the transport vehicle 1 includes surrounding area detection sensors 30. The control unit C (see FIG. 2) of the transport vehicle 1 is configured to stop or decelerate the transport vehicle 1 in response to an obstacle being detected in the surrounding area of the transport vehicle 1 by the surrounding area detection sensors 30 while the transport vehicle 1 is traveling. An example of an obstacle detected by the surrounding area detection sensor 30 is another transport vehicle 1. This makes it possible to avoid collisions between transport vehicles 1 traveling unmanned. Examples of the surrounding area detection sensors 30 include optical sensors, ultrasonic sensors, LiDAR (Light Detection And Ranging), sonar sensors, and millimeter wave radars.

The surrounding area detection sensors 30 of this embodiment are configured to detect an obstacle in each of a front range R1, a rear range R2, a left range R3, and a right range R4 of the transport vehicle 1, which are defined as detection ranges R. The surrounding area detection sensors 30 of this example include a front sensor 31 that performs detection in the front range R1 of the transport vehicle 1, a rear sensor 32 that performs detection in the rear range R2 of the transport vehicle 1, a left sensor 33 that performs detection in the left range R3 of the transport vehicle 1, and a right sensor 34 that performs detection in the right range R4 of the transport vehicle 1. That is, in this example, the transport vehicle 1 includes at least four surrounding area detection sensors 30.

Figure 7:
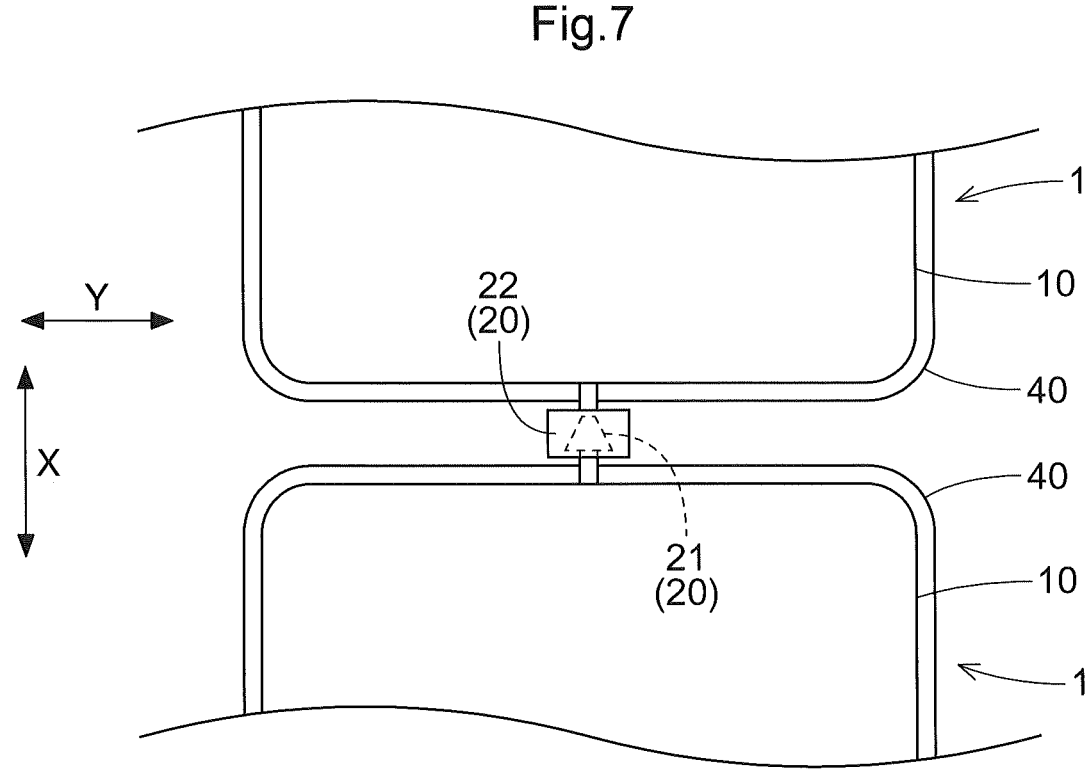
FIG. 7 is a diagram showing a combined state of a plurality of transport vehicles.

As shown in FIG. 7, a plurality of transport vehicles 1 can combine with each other. In a combined state in which the plurality of transport vehicles 1 are adjacent to each other, the plurality of transport vehicles 1 constitute a transport route P in which the plurality of transfer sections 14 cooperate to transport the articles W (see FIG. 8). Each transport vehicle 1 in the article transport facility 100 according to the present disclosure is configured to transport an article W to various locations alone in the case of traveling alone. That is, a transport configuration can be realized in which a specific article W is transported to a specific location. In addition, the plurality of transport vehicles 1 are configured to transport articles W along a continuous transport route P by combining with each other. That is, a transport configuration can be realized in which a plurality of articles W are transported continuously to the same location. Note that the transport route P formed by the plurality of transport vehicles 1 in the combined state can include a linear route, a branching route, a merging route, and the like. In the example shown in FIG. 8, the transport route P includes a linear route and a merging route.

As shown in FIGS. 6 and 7, the transport vehicle 1 of this embodiment further includes coupling sections 20 for coupling with another transport vehicle 1. The coupling sections 20 are provided on the body 10 and protrude from the body 10 in a view in the up-down direction. The transport vehicle 1 and a combination target vehicle 1, which is another transport vehicle 1, are configured to enter a combined state by being coupled to each other by the coupling sections 20 (see FIG. 7).

The transport vehicle 1 of this embodiment has, as the coupling sections 20, a front coupling section 21 provided for a front part of the transport vehicle 1, a rear coupling section 22 provided for a rear part of the transport vehicle 1, a left coupling section 23 provided for a left part of the transport vehicle 1, and a right coupling section 24 provided for a right part of the transport vehicle 1.

The front coupling section 21 of the transport vehicle 1 is configured to couple with the rear coupling section 22 of the combination target vehicle 1, and the rear coupling section 22 of the transport vehicle 1 is configured to couple with the front coupling section 21 of the combination target vehicle 1. The front coupling section 21 and the rear coupling section 22 of this embodiment have shapes corresponding to each other and are configured to engage with each other. The front coupling section 21 of this example has a tapered insertion portion. The rear coupling section 22 has a hole into which the insertion portion of the front coupling section 21 is inserted. The insertion portion of the front coupling section 21 is inserted into the hole of the rear coupling section 22, whereby the front coupling section 21 and the rear coupling section 22 are coupled to each other.

The left coupling section 23 of the transport vehicle 1 is configured to couple with the right coupling section 24 of the combination target vehicle 1, and the right coupling section 24 of the transport vehicle 1 is configured to couple with the left coupling section 23 of the combination target vehicle 1. The left coupling section 23 and the right coupling section 24 of this embodiment have shapes corresponding to each other and are configured to engage with each other. The left coupling section 23 of this example has a tapered insertion portion. The right coupling section 24 has a hole into which the insertion portion of the left coupling section 23 is inserted. The insertion portion of the left coupling section 23 is inserted into the hole of the right coupling section 24, whereby the left coupling section 23 and the right coupling section 24 are coupled to each other.

In this way, each transport vehicle 1 can be combined with other transport vehicles 1, and by combining them, a continuous transport route P can be formed. However, as described above, each transport vehicle 1 includes the surrounding area detection sensors 30 as a collision prevention means, and the transport vehicle 1 stops or decelerates in response to an obstacle being present within the detection range R of the surrounding area detection sensors 30. For this reason, the combination target vehicle 1 that is to be combined with the transport vehicle 1 is detected as an obstacle by the surrounding area detection sensor 30 before the combination. In this case, the collision prevention means using the surrounding area detection sensors 30 prevents the transport vehicles 1 from combining with each other.

Figure 8:
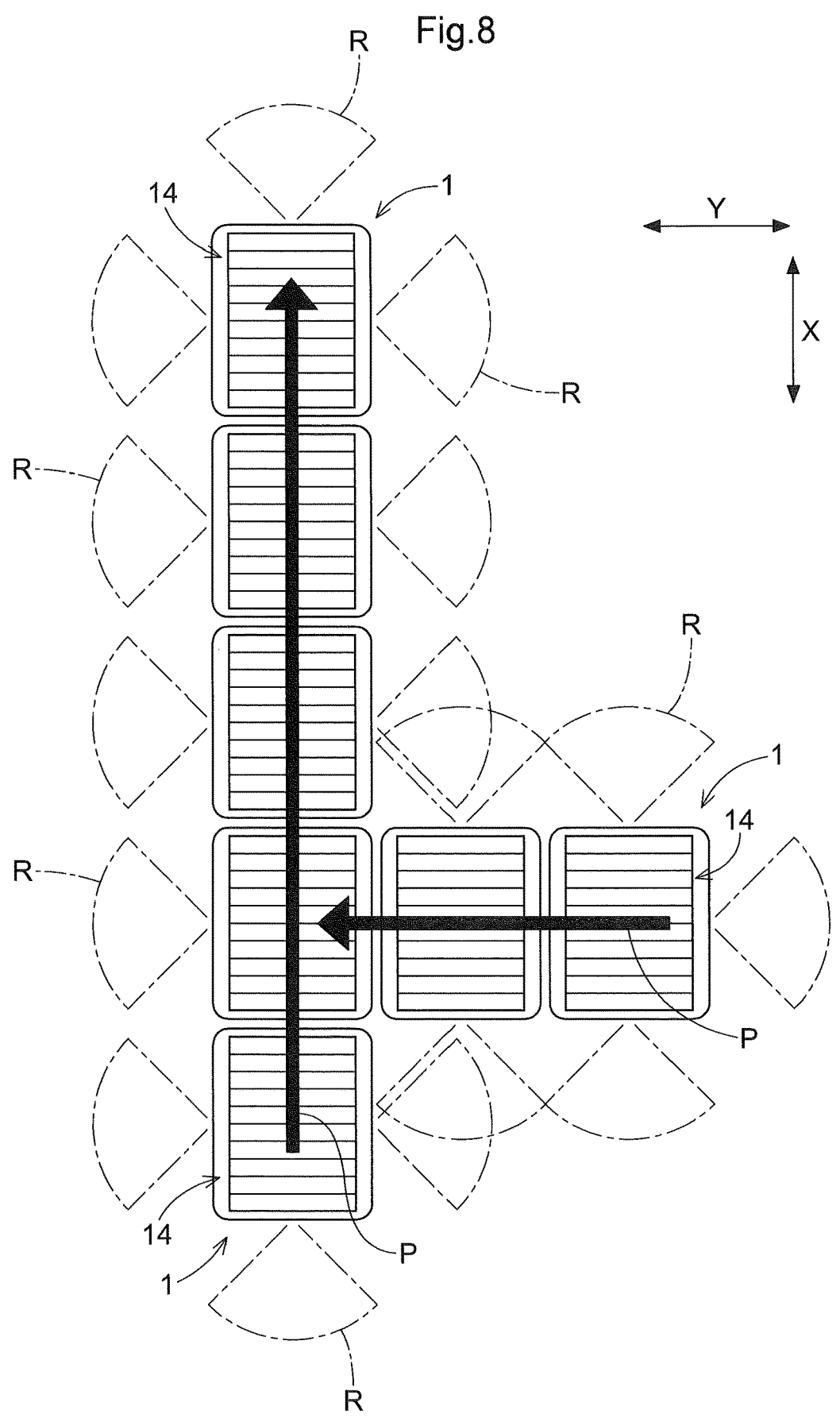
FIG. 8 is a diagram showing a mode of combination performed by a plurality of transport vehicles.

In view of this, as shown in FIGS. 7 and 8, the control unit C (see FIG. 2) of the transport vehicle 1 in the article transport facility 100 according to the present disclosure is configured to at least partially disable the surrounding area detection sensors 30 so as not to detect a combination target vehicle 1 that is another transport vehicle 1 that is a combination target, while the transport vehicle 1 performs a combining operation with the combination target vehicle 1. This makes it possible to prevent the partially disabled surrounding area detection sensors 30 from detecting the combination target vehicle 1 as an obstacle. Accordingly, the transport vehicle 1 and the combination target vehicle 1 can be combined appropriately. Note that partial disabling of the surrounding area detection sensors 30 is performed not only while a plurality of transport vehicles 1 perform a combining operation, but also while the transport vehicle 1 transfers an article W between the transport vehicle 1 and a transfer target location T, as shown in FIG. 3, for example.

The transport vehicle 1 and the combination target vehicle 1 of this embodiment are configured to perform a combining operation by approaching each other or by one approaching the other. The coupling sections 20 of the transport vehicle 1 and the combination target vehicle 1 are coupled to each other and the transport vehicle 1 and the combination target vehicle 1 enter a combined state due to the transport vehicle 1 and the combination target vehicle 1 relatively approaching each other.

The transport vehicle 1 and the combination target vehicle 1 of this embodiment can be combined in the body front-rear direction X. For example, the transport vehicle 1 and the combination target vehicle 1 are combined in the body front-rear direction X due to the front coupling section 21 of the transport vehicle 1 and the rear coupling section 22 of the combination target vehicle 1 coupling to each other (see FIG. 7). At this time, the front sensor 31 of the transport vehicle 1 is disabled, and the rear sensor 32 of the combination target vehicle 1 is also disabled. In addition, the travel orientation of at least either the transport vehicle 1 or the combination target vehicle 1 (the one approaching the other) becomes a first travel orientation (see FIG. 5A) while the transport vehicle 1 and the combination target vehicle 1 perform a combining operation of combining in the body front-rear direction X. This allows the transport vehicle 1 and the combination target vehicle 1 to relatively approach each other in the body front-rear direction X to appropriately combine the two vehicles in the body front-rear direction X.

The transport vehicle 1 and the combination target vehicle 1 of this embodiment can be combined in the body width direction Y. For example, the transport vehicle 1 and the combination target vehicle 1 are combined in the body width direction Y due to the left coupling section 23 of the transport vehicle 1 and the right coupling section 24 of the combination target vehicle 1 coupling with each other. At this time, the left sensor 33 of the transport vehicle 1 is disabled, and the right sensor 34 of the combination target vehicle 1 is disabled. Also, the travel orientation of at least either the transport vehicle 1 or the combination target vehicle 1 (the one approaching the other) becomes the second travel orientation (see FIG. 5B) while the transport vehicle 1 and the combination target vehicle 1 perform a combining operation of combining in the body width direction Y. This allows the transport vehicle 1 and the combination target vehicle 1 to relatively approach each other along the body width direction Y to appropriately combine the two vehicles in the body width direction Y.

The plurality of transport vehicles 1 of the present embodiment can travel in a combined state on the travel surface. The plurality of transport vehicles 1 in the combined state can travel while maintaining the combined state by linking to each other through a command from the host control device H or through communication between the control units C mounted in the transport vehicles 1. For example, the plurality of transport vehicles 1 in the combined state are configured to move between different transfer target locations T while maintaining the combined state.

The control unit C of the transport vehicle 1 of the present embodiment sets the upper-limit travel speed for when the transport vehicle 1 performs the combining operation to be lower than the upper-limit travel speed for when the transport vehicle 1 travels alone. This makes it possible to prevent the transport vehicles 1 that are to be combined with each other from forcefully coming into contact with each other while the combining operation is performed. Note that a plurality of transport vehicles 1 may link with each other by emitting and receiving optical signals to and from each other while performing a combining operation, although this is not specifically shown in the drawings. Alternatively, linking may be performed through short-distance wireless communication instead of emitting and receiving optical signals. Alternatively, linking may be performed based on the position information of the transport vehicles 1 that the host control device H keeps track of.

As shown in FIGS. 6 and 7, the transport vehicle 1 of this embodiment includes, in addition to the surrounding area detection sensors 30, a contact sensor 40 that detects that a contacting object has come into contact with the transport vehicle 1. As a result, the contact sensor 40 can detect a contacting object contacting the body 10 even if the surrounding area detection sensors 30 are disabled. For example, it is possible to stop the transport vehicles 1 in response to the transport vehicles 1 not being appropriately coupled to each other and the bodies 10 coming into contact with each other.

In this embodiment, the contact detection range of the contact sensor 40 is set to the entire outer periphery of the body 10 of the transport vehicle 1. In other words, the detection unit of the contact sensor 40 is provided around the entire outer periphery of the body 10 of the transport vehicle 1. For example, the contact sensor 40 is constituted using a bumper sensor.

As shown in FIG. 7, a gap is formed between the contact sensors 40 of adjacent transport vehicles 1 while a plurality of transport vehicles 1 are combined. That is, a gap is formed between adjacent transport vehicles 1 while a plurality of transport vehicles 1 are combined. As a result, the bodies 10 or the contact sensors 40 of the adjacent transport vehicles 1 in the combined state do not come into contact with each other. Accordingly, the above configuration can prevent the transport vehicles 1 from being detected erroneously by the contact sensors 40 while the plurality of transport vehicles 1 are combined.

FIG. 8 shows a mode of combining performed by a plurality of transport vehicles 1. In the illustrated example, a plurality of transport vehicles 1 (five transport vehicles 1) are combined in the body front-rear direction X, and in a portion of the transport vehicle queue, a plurality of transport vehicles 1 (three transport vehicles 1) are combined in the body width direction Y.

The control unit C of the transport vehicle 1 of this embodiment (see FIG. 2) is configured to disable detection in at least the detection range R on the side where the combination target vehicle 1 is present among the plurality of detection ranges R, while the transport vehicle 1 performs a combining operation with the combination target vehicle 1. The control unit C of the transport vehicle 1 of this example is configured to enable detection in the detection range R on the side where the combination target vehicle 1 is not present among the plurality of detection ranges R. Detection in the detection range R on the side where the combination target vehicle 1 is not present is enabled at least while the transport vehicle 1 is traveling.

In the example shown in FIG. 8, each of the plurality of transport vehicles 1 combined in the body front-rear direction X disables detection in the front range R1 or the rear range R2 where the combination target vehicle 1 is present. Each of the plurality of transport vehicles 1 combined in the body width direction Y disables detection in the left range R3 or the right range R4 where the combination target vehicle 1 is present.

Figure 9:
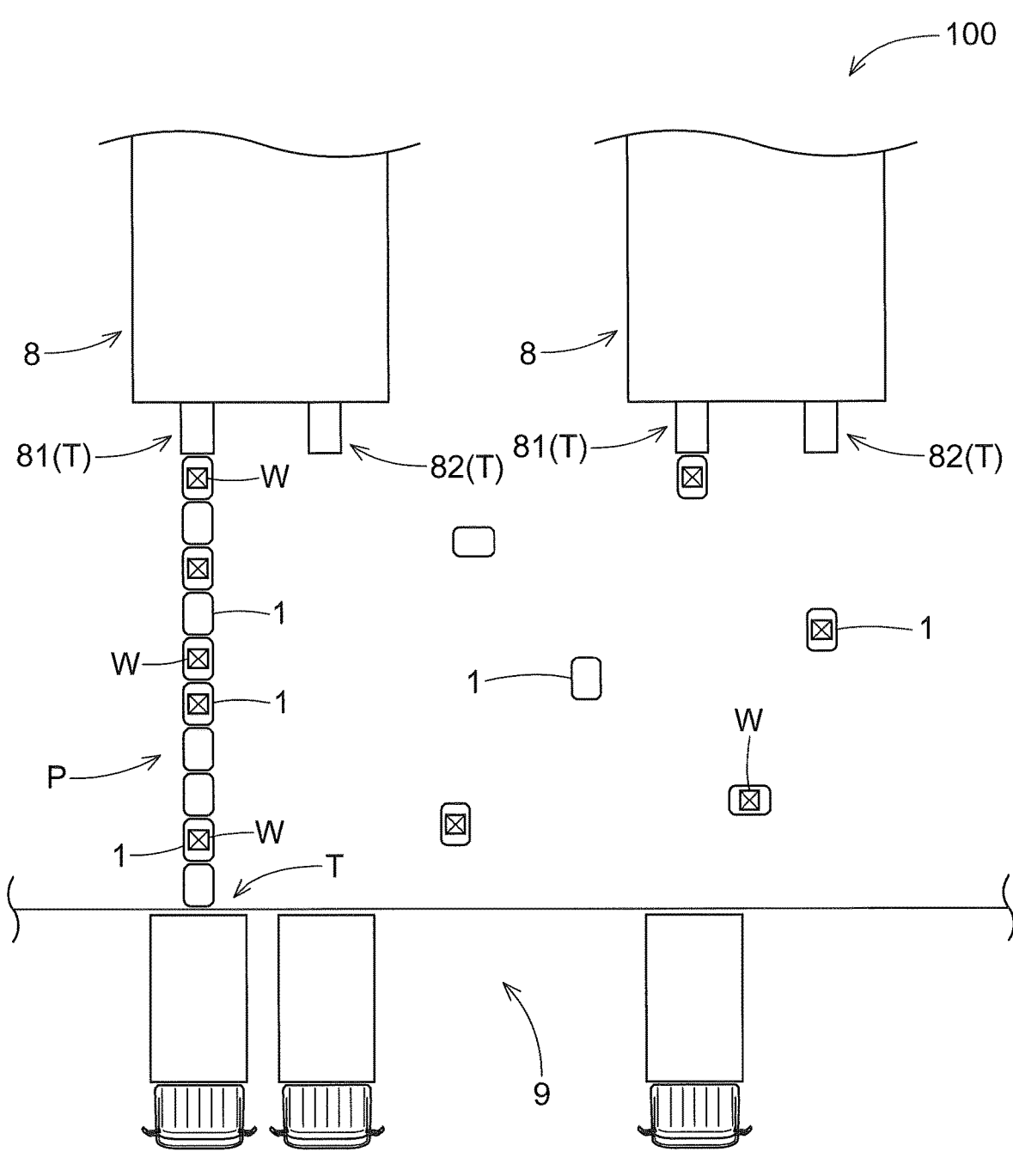
FIG. 9 is a diagram showing an example of a transport configuration using a plurality of transport vehicles in a combined state.

FIG. 9 shows an example of a transport configuration using a plurality of transport vehicles 1 in the combined state. As described above, a plurality of transport vehicles 1 enter the combined state, and thereby constitute a continuous transport route P. This makes it possible to continuously transport a plurality of articles W along the transport route P. That is, due to the plurality of transport vehicles 1 entering the combined state to form a transport route P connecting different transfer target locations T, a plurality of articles W can be transported continuously between the different transfer target locations T. In this manner, the article transport facility 100 according to the present disclosure can realize a transport configuration in which a plurality of articles W are continuously transported to the same location.

In the example shown in FIG. 9, a plurality of transport vehicles 1 are combined to form a transport route P connecting the receiving and shipping area 9 to the automated warehouse 8. This allows a plurality of articles W to be transported continuously from the receiving and shipping area 9 to the automated warehouse 8.

A transport vehicle 1 that is not combined with another transport vehicle 1 can transport an article W alone from a transfer target location T that is a transport source to another transfer target location T that is a transport destination, based on a transport command. In this manner, the article transport facility 100 according to the present disclosure can realize a transport configuration in which a specific article W is transported to a specific location.

Note that two or more transport vehicles 1 in a combined state can move within the facility while maintaining the combined state, although this is not shown in detail in the drawings. Movement while maintaining the combined state may be performed while holding an article W. This also makes it possible for two or more transport vehicles 1 in a combined state to appropriately transport a large article W that is difficult to transport with one transport vehicle 1.

Other Embodiments

Next, other embodiments will be described.

(1) The above embodiment described an example in which the combined state of a plurality of transport vehicles 1 is realized by coupling the coupling sections 20 of the transport vehicles 1. However, there is no limitation to this example, and the plurality of transport vehicles 1 do not need to be physically connected, and may approach each other to enter the combined state. In this case, while the plurality of transport vehicles 1 are in the combined state, the plurality of transport vehicles 1 may travel in synchronization with each other while maintaining the combined state. The control units C included in the transport vehicles 1 communicate with each other so that the transport vehicles 1 are linked with each other and travel in synchronization with each other. Note that some of the plurality of transport vehicles 1 in the combined state may be combined using the coupling sections 20, and others may be combined by being synchronized under control.

(2) The above embodiment described an example in which the coupling section 20 of the transport vehicle 1 and the coupling section 20 of the combination target vehicle 1 have shapes corresponding to each other and are configured to engage with each other. However, there is no limitation to this example, and the coupling sections 20 may be constituted using, for example, electromagnets. In this case, the coupling section 20 of the transport vehicle 1 and the coupling section 20 of the combination target vehicle 1 are configured to adhere to each other while current flows through the coupling sections 20.

(3) The above embodiment described an example in which the transport vehicle 1 includes at least four surrounding area detection sensors 30. However, there is no limitation to this example, and the number of surrounding area detection sensors 30 included in the transport vehicle 1 may also be three or less. The wider the detection range R in which the surrounding area detection sensor 30 can perform detection is, the more the number of surrounding area detection sensors 30 mounted on the transport vehicle 1 can be reduced. For example, it is also possible to use a configuration in which a total of two surrounding area detection sensors 30 are mounted at positions diagonal from each other on the transport vehicle 1 (a right front position and a left rear position, or a left front position and a right rear position) in a view in the up-down direction.

(4) The above embodiment described an example in which the transport vehicle 1 includes surrounding area detection sensors 30, as well as a contact sensor 40 that detects that a contacting object has come into contact with the transport vehicle 1. However, the contact sensor 40 is not an essential configuration. The transport vehicle 1 need not include the contact sensor 40.

(5) The above embodiment described an example in which the first transfer mechanism 141 of the transport vehicle 1 is constituted using a roller conveyor. However, there is no limitation to this example, and the first transfer mechanism 141 may be constituted using another conveyor such as a belt conveyor or a chain conveyor, or may be constituted using a mechanism such as a fork.

(6) The above embodiment described an example in which the transfer section 14 of the transport vehicle 1 includes a second transfer mechanism 142 that moves an article W in a direction different from that of the first transfer mechanism 141. However, there is no limitation to this example, and the transfer section 14 need not include the second transfer mechanism 142. For example, the direction in which the article W is transferred by the first transfer mechanism 141 may be made changeable by the transfer section 14 including a turning section that turns the first transfer mechanism 141 about an up-down axis.

(7) The above embodiment described an example in which the control unit C of the transport vehicle 1 is configured to at least partially disable the surrounding area detection sensors 30 so as not to detect a combination target vehicle 1 that is another transport vehicle 1 that is a combination target, in response to the target vehicle 1 performing a combining operation with the transport vehicle 1. "Partially disabling" here encompasses disabling detection performed by any one of the plurality of surrounding area detection sensors 30, as well as partially disabling a detection range R of a surrounding area detection sensor 30. That is, in this case, the surrounding area detection sensors 30 are configured to expand and shrink the detection ranges R.

(8) Note that the configurations disclosed in the above embodiments can be combined with configurations disclosed in other embodiments as long as no contradiction arises. Regarding other configurations as well, the embodiments disclosed in this specification are merely examples in all respects. Accordingly, various modifications can be made as appropriate without departing from the spirit of the present disclosure.

11
SUMMARY OF THE PRESENT EMBODIMENT

The following is a summary of the present embodiment. An article transport facility including a plurality of transport vehicles configured to transport an article by traveling on a travel surface without a track, in which each of the transport vehicles includes:

a placement section on which the article is placeable;

a transfer section configured to transfer the article placed on the placement section to and from a transfer target location;

a surrounding area detection sensor; and a control unit configured to control the transport vehicle, the control unit is configured to stop or decelerate the transport vehicle in response to the surrounding area detection sensor detecting an obstacle in a surrounding area of the transport vehicle while the transport vehicle is traveling, in a combined state in which the plurality of transport vehicles are combined in such a manner as to be adjacent to each other, the plurality of transport vehicles constitute a transport route in which the plurality of transfer sections cooperate to transport the article, and while the transport vehicle performs a combining operation with a combination target vehicle that is another transport vehicle that is a combination target, the control unit at least partially disables the surrounding area detection sensor in such a manner as not to detect the combination target vehicle.

According to this configuration, each transport vehicle can transport an article to various locations alone, and a plurality of transport vehicles can be combined to transport an article along a continuous transport route. That is, it is possible to use the transport vehicles to realize a transport configuration in which a specific article is transported to a specific location and a transport configuration in which a plurality of articles are continuously transported to the same location. Also, these transport configurations of a plurality of types can be flexibly changed depending on the operation of the facility. According to this configuration, while each transport vehicle travels alone, it is possible to avoid contact between the transport vehicles by using the surrounding area detection sensors. In response to the transport vehicles performing a combining operation, the surrounding area detection sensors are partially disabled, and therefore the transport vehicles can appropriately perform the combining operation. As described above, this configuration makes it possible to realize a plurality of transport configurations while suppressing the number of types of transport devices.

It is preferable that the control unit sets an upper limit travel speed for when the transport vehicle performs the combining operation to be lower than an upper-limit travel speed for when the transport vehicle travels alone.

This configuration makes it possible to prevent the transport vehicles that are to be combined with each other from forcefully coming into contact with each other while the combining operation is performed.

It is preferable that each of the transport vehicles includes, in addition to the surrounding area detection sensor, a contact sensor configured to detect that a contacting object has come into contact with the transport vehicle, and while the plurality of the transport vehicles are in the combined state, a gap is formed between the contact sensors of the transport vehicles adjacent to each other.
This configuration makes it possible for the contact sensor to detect a contacting object coming in contact with the body even if the surrounding area detection sensors are disabled. For example, it is possible to stop the transport vehicles if the coupling of the transport vehicles is not suitably performed and the bodies thereof come into contact with each other. Also, while a plurality of transport vehicles are in the combined state, a gap is formed between the transport vehicles that are adjacent to each other, and therefore it is possible to avoid a situation in which a transport vehicle is erroneously detected by the contact sensor.

It is preferable that while the plurality of transport vehicles are in the combined state, the plurality of transport vehicles travel in synchronization with each other while maintaining the combined state.

This configuration makes it possible to realize the combined state through control due to the plurality of transport vehicles traveling in synchronization with each other. For this reason, it is possible to eliminate the need for the coupling sections for physically coupling the plurality of transport vehicles with each other.

It is preferable that each of the transport vehicles further includes a coupling section for coupling with another transport vehicle of the plurality of transport vehicles, the transport vehicle and the combination target vehicle are configured to enter the combined state in response to being coupled by the coupling sections of the transport vehicle and the combination target vehicle, each of the transport vehicles includes, as the coupling section, a front coupling section provided for a front part of the transport vehicle, a rear coupling section provided for a rear part of the transport vehicle, a left coupling section provided for a left part of the transport vehicle, and a right coupling section provided for a right part of the transport vehicle, the front coupling section of the transport vehicle couples with the rear coupling section of the combination target vehicle, the rear coupling section of the transport vehicle couples with the front coupling section of the combination target vehicle, the left coupling section of the transport vehicle couples with the right coupling section of the combination target vehicle, and the right coupling section of the transport vehicle couples with the left coupling section of the combination target vehicle.

This configuration makes it possible to couple other transport vehicles in a front-rear direction and in a left right direction of each transport vehicle. Accordingly, it is easy to flexibly set the shape of the transport route constituted by the transfer sections of the plurality of transport vehicles.

It is preferable that the surrounding area detection sensor is configured to detect an obstacle, with a front range, a rear range, a left range, and a right range of the transport vehicle as detection ranges, and while the transport vehicle performs the combining operation with the combination target vehicle, the control unit disables detection of at least the detection range on a side where the combination target vehicle is present among the detection ranges.

This configuration makes it possible to effectively detect an obstacle with the surrounding area detection sensor without influencing the combining operation of the plurality of transport vehicles, while preventing the surrounding area detection sensor from hindering the combining operation of the plurality of transport vehicles.

INDUSTRIAL APPLICABILITY

The technology disclosed herein can be used in an article transport facility that includes a plurality of transport vehicles that transport articles by traveling on a travel surface without a track.

What is claimed is:

1. An article transport facility comprising:
a plurality of transport vehicles configured to transport an article by traveling on a travel surface without a track, and
wherein:
each of the transport vehicles comprises:
  a placement section on which the article is placeable;
  a transfer section configured to transfer the article placed on the placement section to and from a transfer target location;
  a surrounding area detection sensor; and
  a control unit configured to control the transport vehicle,
the control unit is configured to stop or decelerate the transport vehicle in response to the surrounding area detection sensor detecting an obstacle in a surrounding area of the transport vehicle while the transport vehicle is traveling,
in a combined state in which the plurality of transport vehicles are combined in such a manner as to be adjacent to each other, the plurality of transport vehicles constitute a transport route in which the plurality of transfer sections cooperate to transport the article, and
while the transport vehicle performs a combining operation with a combination target vehicle that is another transport vehicle that is a combination target, the control unit at least partially disables the surrounding area detection sensor in such a manner as not to detect the combination target vehicle.

2. The article transport facility according to claim 1, wherein the control unit sets an upper-limit travel speed for when the transport vehicle performs the combining operation to be lower than an upper-limit travel speed for when the transport vehicle travels alone.

3. The article transport facility according to claim 1, wherein each of the transport vehicles comprises, in addition to the surrounding area detection sensor, a contact sensor configured to detect that a contacting object has come into contact with the transport vehicle, and wherein while the plurality of the transport vehicles are in the combined state, a gap is formed between the contact sensors of the transport vehicles adjacent to each other.

4. The article transport facility according to claim 1, wherein while the plurality of transport vehicles are in the combined state, the plurality of transport vehicles travel in synchronization with each other while maintaining the combined state.

5. The article transport facility according to claim 1, wherein:
each of the transport vehicles further comprises a coupling section for coupling with another transport vehicle of the plurality of transport vehicles,
the transport vehicle and the combination target vehicle are configured to enter the combined state in response to being coupled by the coupling sections of the transport vehicle and the combination target vehicle,
each of the transport vehicles comprises, as the coupling section, a front coupling section provided for a front part of the transport vehicle, a rear coupling section provided for a rear part of the transport vehicle, a left coupling section provided for a left part of the transport vehicle, and a right coupling section provided for a right part of the transport vehicle,
the front coupling section of the transport vehicle couples with the rear coupling section of the combination target vehicle,
the rear coupling section of the transport vehicle couples with the front coupling section of the combination target vehicle,
the left coupling section of the transport vehicle couples with the right coupling section of the combination target vehicle, and
the right coupling section of the transport vehicle couples with the left coupling section of the combination target vehicle.

6. The article transport facility according to claim 1, wherein the surrounding area detection sensor is configured to detect an obstacle, with a front range, a rear range, a left range, and a right range of the transport vehicle as detection ranges, and
wherein while the transport vehicle performs the combining operation with the combination target vehicle, the control unit disables detection of at least the detection range on a side where the combination target vehicle is present among the detection ranges.

\* \* \* \* \*